March 6, 1934.  G. MAIURI  1,949,651
ABSORPTION REFRIGERATING SYSTEM
Filed Oct. 1, 1931  2 Sheets-Sheet 2
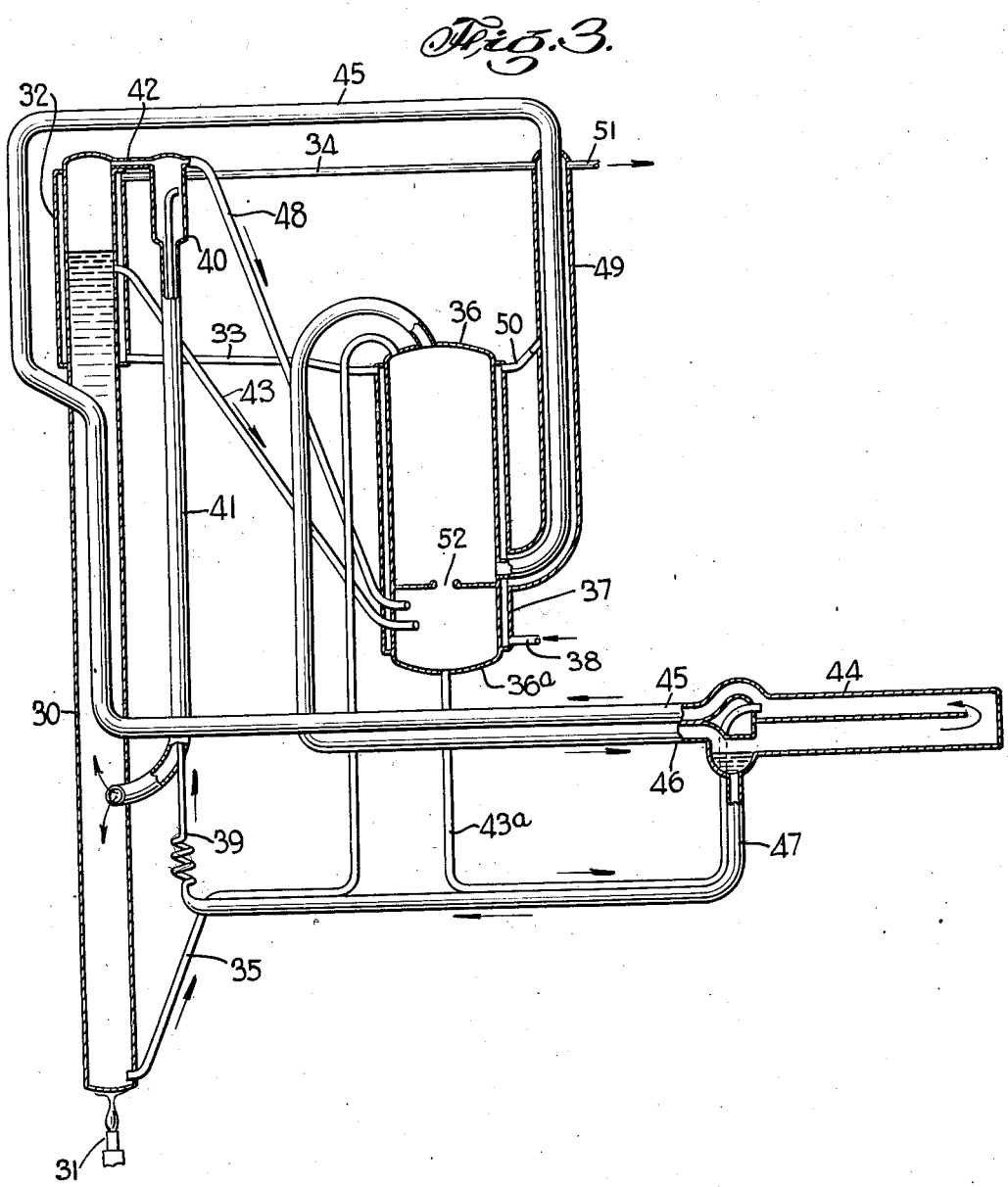

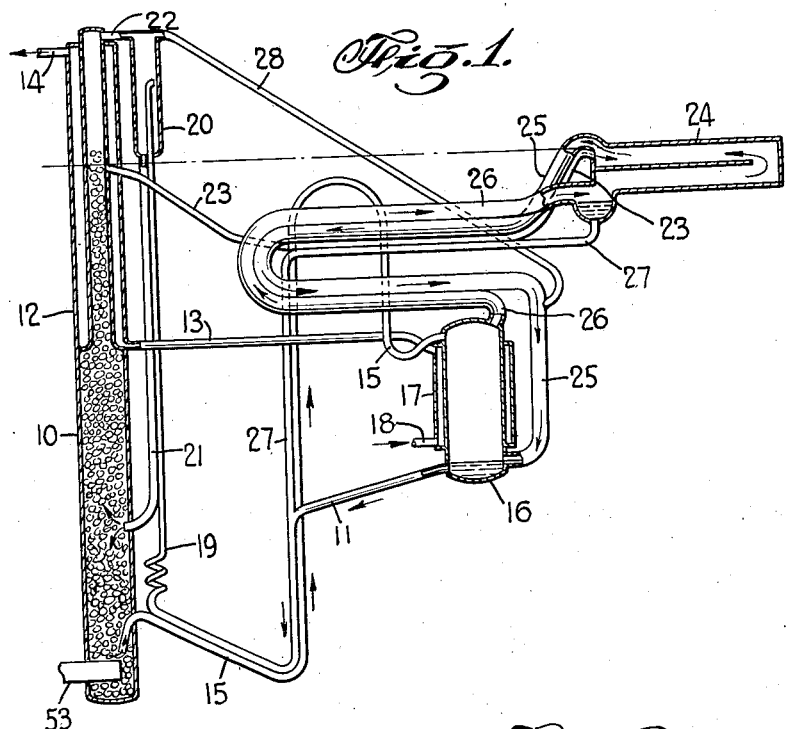
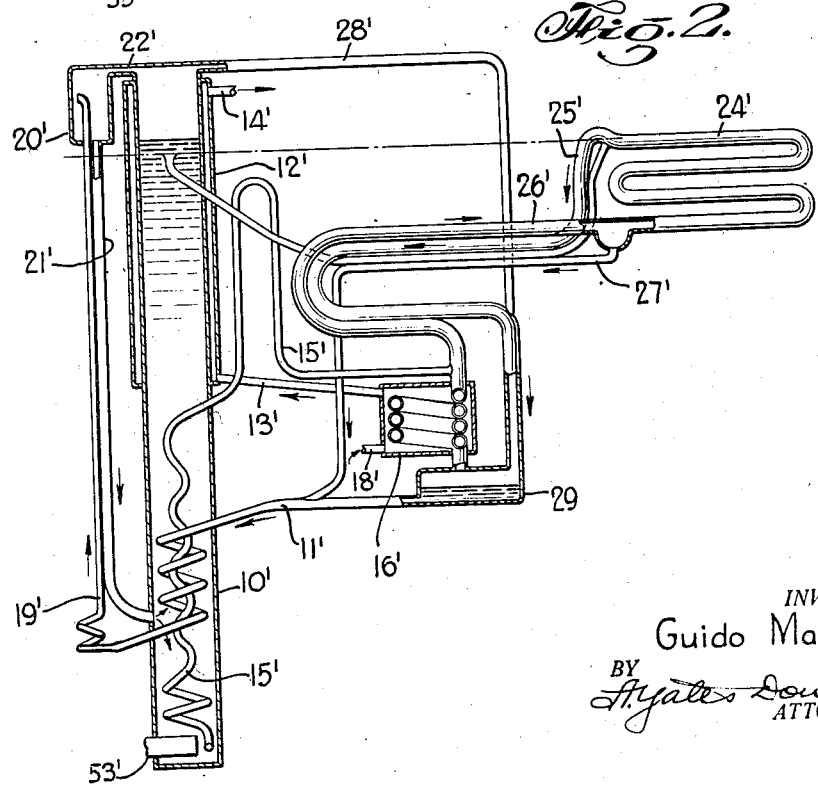

Patented Mar. 6, 1934

1,949,651

UNITED STATES PATENT OFFICE 1,949,651

ABSORPTION REFRIGERATING SYSTEM

Guido Maiuri, London, England, assignor, by mesne assignments, to Electrolux Servel Corporation, New York, N. Y., a corporation of Delaware Application October 1, 1931, Serial No. 566,207
In Germany January 5, 1931

26 Claims. (Cl. 62—119.5)

This invention relates to refrigeration and more particularly to absorption refrigerating apparatus of the pressure equalized type in which circulates an inert pressure equalizing gas, such as hydrogen.

In absorption refrigerating systems, refrigerant gas expelled from solution in the generator by the application of heat contains absorption liquid vapor which is a source of heat loss in the condenser. It is an object of this invention to provide an absorption refrigerating system in which absorption liquid vapor is removed from the refrigerant gas by contact with enriched absorption liquid in the generator.

Another object is to provide a system in which refrigerant gas is expelled from solution, analyzed, and condensed to a liquid in a single fluid column.

Another object is to separate liquid refrigerant from absorption liquid in a single fluid column.

Another object is to utilize the heat of condensation of absorption liquid vapor to expel refrigerant from solution in the generator of absorption refrigerating apparatus.

Another object is to effect heat transfer between solution flowing to and from and the solution in the generator of absorption refrigerating apparatus.

A further object is to effect heat exchange between the gas circulating circuit and refrigerant solution in the generator of absorption refrigerating apparatus.

Other objects and advantages will be apparent from the following description taken in connection with the accompanying drawings, wherein Fig. 1 is an absorption refrigerating system of the pressure equalized type contemplated by this invention;

Fig. 2, a modification of the system shown in Fig. 1; and

Fig. 3, a refrigerating system operating on the resorption principle embodying this invention.

Referring to Fig. 1 of the drawings, an upright cylindrical vessel 10, combining the generator, analyzer, and condenser, and which will hereinafter be referred to as a separator, is constructed with its upper portion narrower than its lower portion and is heated at its lower end by any suitable heating means 53. The narrow upper portion of the separator 10 is cooled by water from conduit 13 circulating through jacket 12 and discharging through conduit 14. The separator 10 contains a solution of suitable refrigerant, such as ammonia, in an absorption liquid such as water.

From the lower part of the separator 10 a conduit 15 is connected to the upper part of an absorber 16, which latter is cooled by water from conduit 18 circulating in jacket 17, and passing through conduit 13 to the separator cooling jacket 12. The lower part of absorber 16 is connected through conduit 11, and a thermosiphon pump 19, which latter is heated by any suitable means, to a vessel 20 which is in heat exchange relation with the separator cooling jacket 12. The bottom of vessel 20 is connected to the lower part of separator 10 through conduit 21 and the top of vessel 20 is connected to the top of separator 10 through conduit 22. The connection of conduit 21 to separator 10 is at a level where the temperature of the solution in the separator is such that the concentration is approximately the same as the concentration of the enriched absorption liquid entering through conduit 21 as hereinafter more fully set forth.

A conduit 23 connects the upper part of the evaporator 24 with the upper part of separator 10 at a point slightly below its normal liquid level. The top of the evaporator 24 is connected to the lower part of absorber 16 by means of a conduit 25 in heat exchange relation with conduit 26 leading from the top of the absorber to the lower part of the evaporator. The bottom of the evaporator is connected to the enriched absorption liquid return line 11 through conduit 27. The top of vessel 20 communicating with the top of separator 10 through conduit 22 is connected through a pressure equalizing conduit 28 to conduit 25 which is part of the gas circulating system.

As shown in Fig. 1 the separator 10 is preferably filled with glass beads, iron scraps, or the like, which dampen convection currents and finely divide the gas expelled from solution by heat. This is fully set forth in the co-pending application of Guido Maiuri et al, Serial No. 460,018, filed June 9, 1930, now Patent No. 1,905,727, patented April 25, 1933.

In operation, by the application of heat to the lower end of separator 10, refrigerant gas is expelled from solution, which gas contains a quantity of vapor of the absorption liquid. The gas rises in the form of bubbles through the separator, being finely divided in ascent by the small solid particles such as glass beads in the path. As the gas bubbles rise toward the cool upper part of the separator the temperature gradually decreases, whereupon the absorption liquid vapor condenses and the heat of condensation is absorbed in the solution, expelling more refrigerant gas. As refrigerant gas reaches the upper part of the separator it is condensed by the transfer of heat to the cooling water flowing in jacket 12. Thus, during operation, the bottom of the separator contains weak absorption liquid while in the upper part of the separator there is substantially pure liquid refrigerant.

Liquid refrigerant flows from the upper part of the separator through conduit 23 into the evaporator 24 where it evaporates into an inert pressure equalizing gas such as hydrogen, absorbing heat from the surrounding medium. The resulting gas mixture passes through conduit 25 into the lower part of absorber 16, in which latter refrigerant gas is absorbed by weak absorption liquid entering the top of the absorber from the lower part of the separator through conduit 15 and the inert gas returns to the evaporator through conduit 26.

Enriched absorption liquid accumulates in the bottom of the absorber from where it flows through conduit 11 to thermo-siphon pump 19 which in a well known manner raises the enriched solution into vessel 20 wherein the pumping vapor is condensed by transfer of heat to the cooling water in jacket 12 and the solution returns to the separator through conduit 21, entering the separator at a point where the temperature of the separator is such that the concentration of its contents is approximately the same as the concentration of the entering solution. Unevaporated liquid is returned from the evaporator 24 to the separator through conduit 27 which connects to the absorption liquid return line 11 and thermo-siphon pump 19.

The system illustrated in Fig. 2 is a modification of that shown in Fig. 1 and corresponding parts are similarly indicated. In this system, the evaporator 24' is shown as a pipe coil and the absorber 16' is a pipe coil within a cooling vessel in which water from conduit 18' circulates and passes through conduit 13' to the cooling jacket 12' around the upper part of separator 10'. The lower end of the absorber is connected to a collecting vessel 29 which is connected through conduit 11' to the thermo-siphon pump 19'.

A portion of conduit 11' is formed as a coil arranged as shown in heat exchange relation with warm solution in the separator. The conduit 15' for conveying weak solution from the lower part of the separator to the upper part of the absorber also has a portion formed as a coil which extends in heat exchange relation with the solution in the separator from the bottom to the upper cool part of the latter. With this arrangement, heat exchange between the solution flowing to and from the separator is retained but effected through the solution in the separator. The weak absorption liquid withdrawn from the bottom of the separator is cooled by the transfer of heat to the solution above it in the separator before flowing to the absorber and the heat from the weak absorption liquid expels refrigerant gas from the solution around the portion of pipe 15' within the separator. The cool enriched absorption liquid returning from the absorber is warmed by the absorption of heat from the solution around the portion of conduit 11' within the separator before it reaches the thermo-siphon pump 19'. With this arrangement the heat losses which occur in the usual heat exchanger are reduced. Although conduits 11' and 15' are shown coiled within the separator it is also possible to obtain similar results by coiling these pipes around the outside of and in thermal contact with the separator. In this modification also the separator 10' is preferably provided with baffle means such as glass beads as in the separator 10 shown in Fig. 1.

In Fig. 3 is shown a refrigerating system contemplated by this invention operating on the resorption principle. A separator 30 similar to that shown in Figs. 1 and 2 containing a solution of refrigerant in an absorption liquid is heated at the lower end by any suitable heating means 31 and cooled at the upper end by water from conduit 33 circulating through jacket 32 and discharging through conduit 34. From the upper part of separator 30, at a point slightly below the normal liquid level, a pipe 43 conducts concentrated refrigerant solution to a receiver or resorber 36a which is formed in the lower part of absorber 36. Both the absorber and resorber are cooled by water from conduit 38 circulating through jacket 37 and passing through conduit 33 to the separator cooling jacket 32. From the bottom of the resorber, conduit 43a conducts the refrigerant solution to evaporator 44 where the refrigerant evaporates into an inert pressure equalizing gas such as hydrogen, absorbing heat from the surrounding medium.

Unevaporated liquid accumulates in the lower part of the evaporator 44 and flows through conduit 47 to a thermo-siphon pump 39 heated by any suitable means and which discharges into vessel 40 from where the solution returns through conduit 41 to the separator 30 as described in connection with Fig. 1. The mixture of refrigerant and inert gas flows from the evaporator through conduit 45 which extends in heat exchange relation with solution in the upper part of separator 30 and discharges into the lower part of absorber 36. A portion of conduit 45 adjacent the absorber is cooled by water circulating through jacket 49, one end of which is connected to water jacket 37 around the absorber. These jackets are also in communication through conduit 50 from the top of jacket 37. The other end of jacket 49 is connected to the jacket 32 around the upper part of separator 30 through conduit 34. Cooling water enters the circulating system through conduit 38 to the lower part of jacket 37 and discharges through conduit 51 from the upper end of jacket 49.

Weak absorption liquid from the bottom of separator 30 passes through conduit 35 into the top of absorber 36 and flowing downwardly absorbs refrigerant gas from the gas mixture entering the bottom of the absorber through conduit 45. Enriched absorption liquid accumulates in the bottom of the absorber and overflows through opening 52 into the resorber 36a from where it passes, along with the refrigerant solution from the separator into the evaporator 44 through conduit 43a.

The inert pressure equalizing gas returns from the top of the absorber 36 to evaporator 44 through conduit 46. Gas circulation is aided by the absorption of heat from the solution in the separator 30 by the gas in conduit 45 where it extends through the separator whereby the solution is cooled and the gas mixture heated. The heat absorbed by the gas circulating through the separator is removed before entrance into the absorber by the cooling water circulating in jacket 49. Thus the rising portion of the gas circulating system is heated and the descending portion is cooled.

A pressure equalizing line 48 from the resorber 36a is connected to the top of vessel 40 which latter is connected to the top of separator 30 through conduit 42. With this arrangement the pumping vapor need not be condensed in vessel 40 but passes through pipe 48 to the resorber 36a where it is absorbed by solution from the absorber.

It will be obvious to those skilled in the art that various other changes may be made in the construction and arrangement without departing from the spirit of the invention and therefore the invention is not limited to what is shown in the drawings and described in the specification but only as indicated in the appended claims.

I claim:

1. In the art of refrigerating with absorption type apparatus, the method which includes maintaining a column of solution comprising a refrigerant in an absorption liquid, heating the lower end of said column to expel refrigerant gas from solution, and cooling the upper part of said column so that absorption liquid vapor condenses out of the ascending refrigerant gas and the latter condenses to liquid at the upper end of said column.

2. The method of refrigerating which comprises maintaining a column of solution comprising a refrigerant in an absorption liquid, heating the lower end of said column to expel refrigerant gas from solution, removing heat from the expelled gas rising in the column to first condense absorption liquid vapor out of the gas and then condense the refrigerant gas to liquid at the top of the column, evaporating said liquid refrigerant into an inert gas by the absorption of heat from the surrounding medium, conducting the resulting gas mixture into contact with weak absorption liquid withdrawn from the bottom of said column to absorb refrigerant gas from the mixture, and returning the enriched absorption liquid to said column.

3. The method of refrigerating which comprises maintaining a column of solution comprising a refrigerant in an absorption liquid, heating the lower end of said column to expel refrigerant gas from solution, finely dividing the gas bubbles thus formed, restricting turbulence and convection in said column, decreasing the temperature of the ascending gas in said column to first condense absorption liquid vapor out of the gas and then condense the refrigerant gas to liquid at the top of said column, evaporating said liquid refrigerant into an inert gas by absorption of heat from the medium to be cooled, conducting the resulting gas mixture into contact with weak absorption liquid withdrawn from the bottom of said column to absorb refrigerant gas from the mixture, and returning the enriched absorption liquid to said column at a level at which the solution in the column is at a concentration approximately equal to that of the solution being returned.

4. The method of refrigerating which comprises maintaining a column of solution comprising a refrigerant in an absorption liquid, heating the lower end of said column to expel refrigerant gas from solution, cooling the upper part of said column to first condense absorption liquid vapor out of the ascending gas and then condense the refrigerant gas to liquid at the top of said column, evaporating said liquid refrigerant into an inert gas by absorption of heat from the medium to be cooled, conducting the resulting gas mixture in contact with weak absorption liquid withdrawn from the lower end of said column to absorb refrigerant gas from the mixture, adding the enriched absorption liquid to the liquid being evaporated into the inert gas, returning unevaporated liquid to said column by thermo-siphonic action, and absorbing vapor resulting from the thermo-siphonic action into the liquid which is evaporated into the inert gas.

5. The method of refrigerating which comprises maintaining a column of solution comprising a refrigerant in an absorption liquid, heating the lower end of said column to expel refrigerant gas from solution, removing heat from the expelled gas rising in the column to first condense absorption liquid vapor out of the gas and then condense the refrigerant gas to liquid at the top of the column, evaporating said liquid refrigerant into an inert gas by absorption of heat from the medium to be cooled, conducting the resulting gas mixture into contact with weak absorption liquid withdrawn from the bottom of said column to absorb refrigerant gas from the mixture, adding the enriched absorption liquid to the liquid from the top of said column being evaporated into the inert gas, and returning unevaporated liquid to said column.

6. Absorption refrigerating apparatus including a vertically elongated vessel, means for heating the lower part of said vessel, means for cooling the upper part of said vessel, an evaporator, an absorber, gas circulating conduits between said evaporator and absorber, a liquid supply line from the upper part of said vessel to said evaporator, and liquid circulating means between said absorber and said vessel.

7. Absorption refrigerating apparatus including an upright cylindrical vessel, baffle means in said vessel, means for heating the lower part of said vessel, means for cooling the upper part of said vessel, an evaporator, an absorber, conduits for the circulation of gas between said evaporator and absorber, a liquid supply line from the upper part of said vessel to said evaporator, and means including a thermo-siphon pump for circulating absorption liquid between the absorber and said vessel.

8. Absorption refrigerating apparatus including an upright cylindrical vessel, means for heating the lower part of said vessel, means for cooling the upper part of said vessel, a plurality of small solid particles in said vessel with fluid passages therebetween, an evaporator, an absorber, conduits for the circulation of gas between said evaporator and absorber in mutual heat exchange relation, a conduit for liquid from the upper part of said vessel to the upper part of said evaporator, means including a thermo-siphon pump for circulating absorption liquid between the absorber and said vessel, and a return conduit for liquid from the evaporator to the absorption liquid circuit.

9. Absorption refrigerating apparatus including a vertically elongated liquid vessel, means for heating the lower part of said vessel, means for cooling the upper part of said vessel, an evaporator, an absorber, gas circulating conduits between said evaporator and absorber, a liquid supply line from the upper part of said vessel to said evaporator, a heat exchanger in thermal exchange relation with said vessel, and means including said heat exchanger defining an absorption liquid circulating circuit between said absorber and said vessel.

10. Absorption refrigerating apparatus including a vertically elongated vessel, means for heating the lower part of said vessel, means for cooling the upper part of said vessel, an evaporator, an absorber, gas circulating conduits between said absorber and evaporator, a liquid supply line from the upper part of said vessel to said evaporator, a liquid supply line from the lower part of said vessel to said absorber having a portion thereof in heat exchange relation with said vessel, a liquid return line from the absorber to said vessel having a portion thereof in heat exchange relation with said vessel, and fluid circulating means in said liquid return line.

11. Absorption refrigerating apparatus including an upright cylindrical vessel, baffle means in said vessel, means for heating the lower part of said vessel, means for cooling the upper part of said vessel, an evaporator, an absorber, conduits for the circulation of gas between said absorber and evaporator, a liquid supply line from the upper part of said vessel to said evaporator, a heat exchanger within said vessel, and means including said heat exchanger defining an absorption liquid circulating circuit between said absorber and said vessel, and a thermo-siphon pump in said circut.

12. Absorption refrigerating apparatus including an upright cylindrical vessel, means for heating the lower part of said vessel, means for cooling the upper part of said vessel, a plurality of small solid particles filling said vessel with fluid passages therebetween, an evaporator, an absorber, conduits for the circulation of gas between said absorber and evaporator in mutual heat exchange relation, a conduit for liquid from the upper part of said vessel to said evaporator, a conduit for weak absorption liquid from the lower part of said vessel to said absorber including a pipe coil within said vessel, an enriched absorption liquid return line from said absorber to said vessel including a second pipe coil also within said vessel and a thermo-siphon pump, and a conduit from said evaporator to the absorption liquid return line.

13. Absorption refrigerating apparatus including a vertically elongated vessel, means for heating the lower part of said vessel, means for cooling the upper part of said vessel, a first absorber, a second absorber, an evaporator, a liquid conduit from the upper part of said vessel to said second absorber, a conduit for liquid from said first absorber to said second absorber, a liquid supply line to said evaporator from said second absorber, a conduit for liquid from the lower part of said vessel to said first absorber, a liquid return conduit from said evaporator to said vessel, a thermo-siphon pump in last said conduit, a vent for vapor from said pump to said second absorber, and gas circulating conduits between said first absorber and said evaporator.

14. Absorption refrigerating apparatus including a vertically elongated vessel, means for heating the lower part of said vessel, means for cooling the upper part of said vessel, a first absorber, a second absorber, an evaporator, a liquid supply line to said evaporator from the upper end of said vessel including said second absorber, a liquid supply conduit from the lower part of said vessel to said first absorber, a conduit for liquid from said first absorber to said second absorber, a liquid return line from the lower part of said evaporator to said vessel including a thermo-siphon pump, a gas vent from said pump to said second absorber, a conduit for gas from the upper part of first said absorber to the lower part of said evaporator, a gas return conduit from the upper part of said evaporator extending upwardly through a portion of said vessel and downwardly to the bottom of first said absorber, and means for cooling the descending portion of said gas return conduit.

15. Absorption refrigerating apparatus including an upright cylindrical vessel, a plurality of small solid particles filling said vessel, means for heating the lower part of said vessel, means for cooling the upper part of said vessel, an absorber, an evaporator, a receiver, a conduit for liquid from the upper part of said vessel to said receiver, a conduit for liquid from said absorber to said receiver, a liquid supply line from said receiver to said evaporator, a liquid return circuit from said evaporator to said vessel including a thermo-siphon pump, a conduit for liquid from the lower part of said vessel to said absorber, gas circulating conduits between said evaporator and absorber, one of said conduits having an ascending portion within said vessel, and means for cooling a descending portion of last said conduit.

16. In absorption type refrigerating apparatus, an element comprising means for retaining a column of liquid solution, means for heating the liquid in the lower end of the column, and means for continuously cooling the liquid in the upper part of the column.

17. In absorption type refrigerating apparatus, an element comprising means for retaining a column of liquid solution, baffle means for preventing turbulence and convection in said column, means for heating liquid in the lower end of said column, and means for continuously cooling liquid in the upper part of said column.

18. In absorption type refrigerating apparatus, a separator comprising a vertically elongated vessel adapted to retain a column of liquid solution, means for heating the lower part of said vessel, and means for continuously cooling liquid in the upper part of said column.

19. In absorption type refrigerating apparatus, a separator comprising a vertically elongated vessel adapted to retain a column of liquid solution, a plurality of small solid particles in said vessel with fluid passages therebetween, means for heating the lower end of said column, and means for cooling the upper part of said column.

20. In absorption type refrigerating apparatus a separator comprising, a vertically elongated vessel adapted to retain a column of liquid solution, means for heating the lower end of said column, means for cooling the upper part of said column, means for separately withdrawing liquid from the upper and lower ends of said column, and means for delivering liquid to said column intermediate the ends thereof.

21. In the art of refrigerating with an absorption type system the method which includes, maintaining a column of liquid solution comprising refrigerant in an absorption liquid, heating the lower end and cooling the upper end of said column to reduce and increase the concentration in said ends respectively, and reducing to a minimum turbulence and convection of liquid in said column.

22. The method of refrigerating which comprises, maintaining a column of solution of refrigerant in an absorption liquid, heating the lower end, and cooling the upper end of said column to reduce and increase the concentration of solution in said ends respectively, separately withdrawing liquid from the upper and lower ends of said column, evaporating liquid withdrawn from the upper end of said column into an inert gas, absorbing refrigerant vapor out of the resulting gas mixture into liquid withdrawn from the bottom of said column, and returning the enriched solution to an intermediate portion of said column.

23. The method of refrigerating which comprises, maintaining a column of liquid solution of refrigerant in an absorbent, heating and cooling the lower and upper ends of said column to decrease and increase the concentration of the solution in said ends respectively, separately withdrawing liquid from the upper and lower ends of said column, evaporating refrigerant out of the solution withdrawn from the upper end of said column into an inert gas, absorbing refrigerant vapor out of the resulting gas mixture into solution withdrawn from the lower end of said column, again evaporating the refrigerant out of the enriched solution, and returning unevaporated liquid to said column.

24. Refrigerating apparatus including, a vessel adapted to retain a column of liquid solution of refrigerant in an absorbent, means for heating the lower end of said column, means for cooling the upper part of said column, a circuit containing an inert gas, means for transferring liquid from the upper end of said column to one portion of said gas circuit, and means for circulating liquid from the lower end of said column through another portion of said gas circuit back to an intermediate portion of said column.

25. Refrigerating apparatus including, a vessel adapted to retain a column of liquid solution of refrigerant in an absorbent, means for heating the lower end of said column, means for cooling the upper part of said column, an absorber having upper and lower communicating chambers, an evaporator interconnected with the upper chamber of said absorber for the circulation of an inert gas, a conduit for liquid from the lower end of said column to the upper chamber of said absorber, a conduit for liquid from the upper end of said column to the lower chamber of said absorber, a conduit for liquid from said lower chamber to said evaporator, and means for returning liquid from said evaporator to said column.

26. Refrigerating apparatus including, a vessel adapted to retain a column of liquid solution of refrigerant in an absorbent, means for heating the lower end of said column, means for cooling the upper part of said column, a circuit for an inert gas, means for conducting liquid from the lower end of said column through one portion of said circuit, means for conducting liquid from the upper end of said column and liquid from said first portion of the inert gas circuit to a second portion of the gas circuit, and means for returning liquid from said last portion of the gas circuit to said liquid column.

GUIDO MAIURI.